United States Patent
Byström

(10) Patent No.: US 6,739,787 B1
(45) Date of Patent: May 25, 2004

(54) JOINT DEVICE

(76) Inventor: Johan Adolf Byström, PL 1058 Nordanås, Örnsköldsvik (SE), SE-891 92

( * ) Notice: Subject to any disclaimer, the term of this patent is extended or adjusted under 35 U.S.C. 154(b) by 0 days.

(21) Appl. No.: 10/018,130

(22) PCT Filed: Apr. 30, 1999

(86) PCT No.: PCT/SE99/00724

§ 371 (c)(1), (2), (4) Date: Oct. 30, 2001

(87) PCT Pub. No.: WO00/65978

PCT Pub. Date: Nov. 9, 2000

(51) Int. Cl.⁷ ................................................. F16L 27/04
(52) U.S. Cl. ........................... 403/56; 285/7; 285/145.3
(58) Field of Search ...................... 285/7, 145.3, 146.1, 285/181; 403/56

(56) References Cited

U.S. PATENT DOCUMENTS

| | | | | |
|---|---|---|---|---|
| 4,739,801 A | * | 4/1988 | Kimura et al. | ............... 138/120 |
| 5,288,110 A | * | 2/1994 | Allread | ..................... 285/146.1 |
| 5,449,206 A | * | 9/1995 | Lockwood | ........... 285/146.1 X |
| 5,667,146 A | * | 9/1997 | Pimentel et al. | ...... 285/146.1 X |
| 5,778,939 A | | 7/1998 | Hok-Yin | |

FOREIGN PATENT DOCUMENTS

| | | |
|---|---|---|
| EP | 0788759 A2 | 8/1997 |
| SE | 9600650-7 | 8/1997 |

* cited by examiner

Primary Examiner—John R. Cottingham
(74) Attorney, Agent, or Firm—Dilworth & Barrese, LLP.

(57) ABSTRACT

The present invention relates to a device/connection which can be used e.g. in a vacuum cleaner pipe, which thereby can be made bendable to facilitate vacuum-cleaning under beds, tables and the like. I one simple operation a moveable part (5) can be displaced inwards, whereupon a locking pipe (6) prevents a bendable hose (2) from being bent when the operator so desires, for instance during cleaning of open surfaces without obstacles. Cleaning under beds can however cause the operator to redraw the locking pipe (6) with the moveable part (5), whereupon the vacuum cleaner pipe becomes bendable again and the operator can vacuum-clean under the bed in standing position.

20 Claims, 2 Drawing Sheets

JOINT DEVICE

BACKGROUND OF THE INVENTION

This invention relates to a flexible joint intended to connect two parts with each other, the connected parts being able to be rigid, of hose-type or a combination thereof, for instance of that pipe-type being used in vacuum-cleaners, implying that the joint is positioned between the rigid pipe means, which is connected to the suction nozzle of the vacuum-cleaner, and the hose which is connected to the vacuum-cleaner machine itself.

Vacuum-cleaners, as a rule, are designed in that way that the hose of the vacuum-cleaner at its one end is connected to the vacuum-cleaner machine itself and at its other end to the one end of that pipe which at its other end is connected to the nozzle of the vacuum-cleaner. This pipe, as a rule, is made of plastic material or a light metal material and is accordingly rigidly designed. Furthermore, the pipe has such a length that a person of normal length, who seizes the pipe approximately at the transition portion to the hose can vacuum-clean open areas in an essentially upright position.

If, on the contrary, the person in question should try to vacuum-clean under beds and chests of drawers by means of known equipment, the person in question has to huddle up strongly and even go down on his knees, which is felt very troublesome.

A joint of the kind mentioned by way of introduction is previously known but has not got any larger spreading on the market, probably dependent upon unsatisfying function.

SUMMARY OF THE INVENTION

This invention relates to a new type of flexible joint, preferably a pipe joint, which makes possible an effective and comfortable handling when using the same in for instance the pipeline of the vacuum-cleaner. By means of this new pipe joint is an effective vacuum-cleaning made possible not only on open areas but also on inaccessible areas like for instance areas under beds and chests of drawers. Moreover, the vacuum cleaning is facilitated on top of cup boards and the like.

The pipe joint mentioned has features described herein.

BRIEF DESCRIPTION OF THE DRAWINGS

Two preferred embodiments of the new pipe joint shall be described more closely below with reference to the accompanying drawings, where.

DESCRIPTION OF THE PREFERRED EMBODIMENTS

Figure 1:
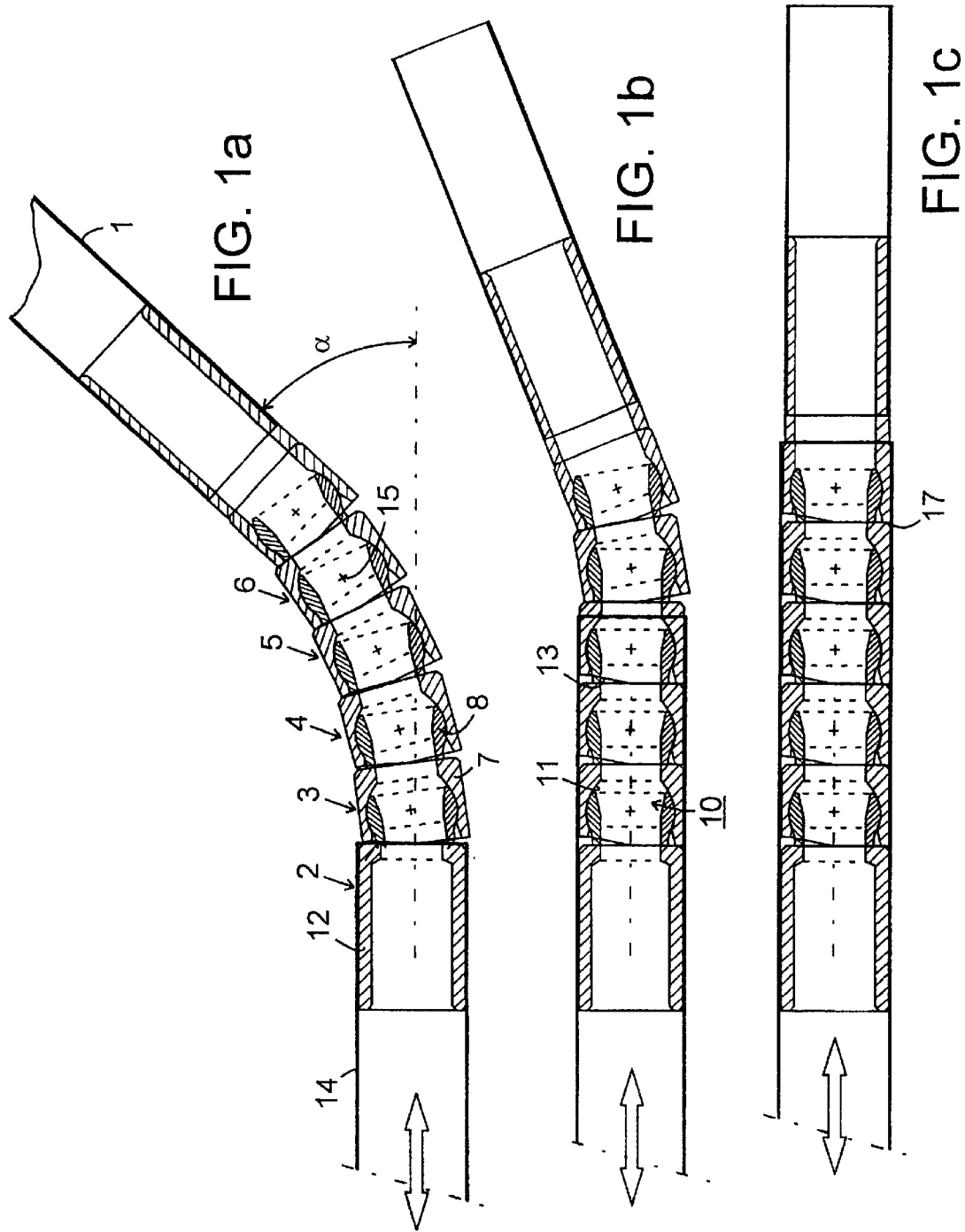
FIG. 1 shows a first embodiment of the pipe joint.
Figure 2:
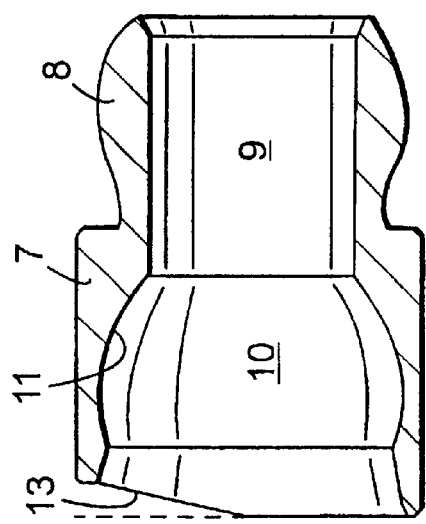
FIG. 2 shows a ball joint being a part of the pipe joint according to FIG. 1.

Referring to FIG. 1 is shown there the new pipe joint. This one is according to the example intended to be placed between two pipelines, the one of which is indicated by the FIG. 1. The pipe joint, according to this embodiment, has five co-operating ball joints 2–6, of which four ones 3–6 are essentially identical. Each identical ball joint 3–6 (see also FIG. 2), comprises a first 7 and a second 8 part. The first part 7 comprises essentially a circular-cylindrical pipe portion, which passes over to the second part 8, which has essentially modified ball-shape with a hole 9 at its centre part, going through it, the modified ball being able to be regarded as truncated at two diametrically opposed portions, which portions are passed by the cavity 9. In order that the second, rounded part 8 of the ball joint 3–6 shall smoothly be adapted to the first part 7 of the following ball joint, the cavity 10 of the mentioned first part has not circular-cylindrical form, but rounded recesses 11 are made in the cavity 10 of the first part 7 of each ball joint 3–6.

The first ball joint 2 has principally the same design as the ball joints 3–6. The only difference is that the first part 12 of the ball joint has a longer circular-cylindrical portion than the corresponding portions of the ball joints 3–6. The reason why is to get a better adaptation of the ball joint 2 to connecting pipeline and locking sleeve, which shall be described more closely below.

As appears from FIG. 1b, c is the front portion of the first part 7 of each ball joint 3–6 bevelled at the top of the part (seen in the position the pipe joint has in FIG. 1). Due to that fact is created an open space 13 between the rear, upper portion of the first part 7 of a ball joint and the front, upper portion of the first part 7 of an adjacent ball joint. This space, as is shown in FIG. 1a, can be effectively utilised for bending the pipe joint. It should be realised that the more ball joints of the shown type that are arranged, the larger can the angle α be made. With that design that the pipe joint has according to this embodiment, the pipe joint cannot be bent downwards in the diametrically opposite direction compared with the upwards-directed bending according to FIG. 1a, because the rear, lower portion of the first part 7 of a ball joint and the front, lower portion of the first part 7 of an adjacent ball joint go into contact with each other at the bottom (see the reference designation 17 in FIG. 1c). This means that, under assumption that the mentioned pipe joint is arranged on the pipeline of a vacuum-cleaner, by turning the pipeline about 180° from the position it has in FIG. 1a, a completely straight pipe joint is obtained, which makes possible an effective vacuum cleaning on open areas.

In FIG. 1 is also shown a locking sleeve 14, which according to this embodiment is simply displaceable forwards and backwards in relation to the ball joints, the displacement being made on the outside of the ball joints. In FIG. 1a are accordingly none of the active ball joints locked, in FIG. 1b are some of the ball joints locked by means of the locking sleeve 14, and in FIG. 1c are all active ball joints locked.

By means of this locking sleeve it is accordingly possible to simply change the value of the angle α from naught and upwards, the change being made in steps. The size of the change of the angle is dependent partly upon the size of the space 13 between the first parts of two adjacent ball joints, partly upon the number of ball joints.

As has been mentioned previously is according to this embodiment the pipe joint intended to be positioned between two pipelines. In this connection the pipe sleeve 14 can be composed of an end portion of the one pipeline. The locking of the pipe joint in this case should accordingly be made by telescopic co-operation between the two pipelines.

As appears from FIG. 1 is a plus sign 15 arranged on each ball joint. With this plus sign is indicated that the second part of the one ball joint is fastened to the first part of the co-operating ball joint in such a way that the pipe joint can be bent upwards as is shown in FIG. 1a but not in the cross direction. Suitably there is a similar fastening between the parts on the opposite side, seen in the diametrical direction. By this arrangement a very stable pipe joint is obtained.

Figure 3:
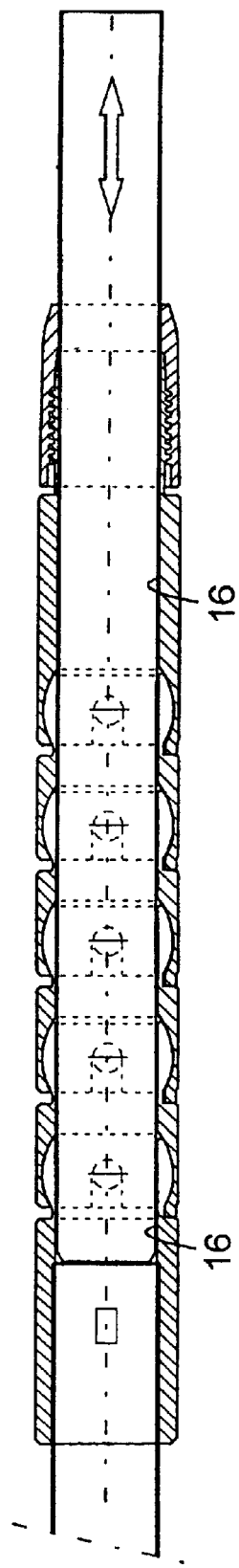
FIG. 3 shows a second embodiment of the pipe joint.

In FIG. 3 is shown a second embodiment of the pipe joint. This pipe joint is fundamentally built up in the same way as that one according to FIG. 1. The difference consists of the placing of the locking sleeve 16. Thus, this locking sleeve is placed inside of the pipe joint but is displaceable in relation to the ball joints in the corresponding way as in the embodiment according to FIG. 1. The locking sleeve 16, according to this second embodiment, constitutes the end portion of one of the pipelines, the locking of the pipe joint being made by telescopic co-operation between the two pipelines.

According to FIG. 3 the locking sleeve 16 is completely pushed in, implying that all ball joints are locked in relation to each other, which in its turn means that the pipe joint is essentially straight.

The invention is of course not limited to the shown and described embodiments but can be modified within the scope of the following claims. Thus, this new invention could have use within different fields and for different products. An example could be the shaft of a cleaning mop. In this connection the new joint should be placed between two parts of the shaft. Furthermore, it is not important if the parts that are connected by the joint are hollow or massive.

The means intended to lock the pipe joints can in the embodiment according to FIG. 1 be composed of the one end portion of the one pipeline or of a separate sleeve that is arranged on the outside of the pipeline.

The new joint is made of suitable material, for instance metal, plastic or a combination thereof.

What is claimed is:

1. A flexible joint intended to connect two parts with each other, the connected parts being able to be rigid, characterized by the combination of the following features:

the joint comprises a plurality of ball joints (3–6), co-operating with each other, allowing the joint to be bent from a position where the two parts and the connecting joint are essentially horizontally directed, to positions where one part (1) forms an angle (α) with the other part;

the joint or one part (1) comprises means (14, 16) movably displaceable along all of the ball joints (3–6) to different positions in relation to the ball joints (3–6) the means being able to enter into engagement with and lock one or more of the ball joints (3–6) resulting in the angle (α) being adjusted in steps from 0° and greater.

2. A joint according to claim 1, characterized in that the means for locking one or more ball joints (3–6) is composed of a sleeve (14) which is dispaceably arranged on the outside of the joint.

3. A joint according to claim 2, characterized in that the sleeve constitutes the end portion of the one connecting part.

4. A joint according to claim 2, characterized in that the sleeve (14) is composed of a separate sleeve which is displaceable on the outside of the joint.

5. A joint according to claim 1, characterized in that the locking means (16) for locking one or more ball joints (3–6) constitutes the end portion of one of the parts and is intended to enter into engagement with the ball joints (3–6) inside of the ball joints (3–6).

6. A joint according to claim 1, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another and that a front, lower, diametrically opposite portion, is designed such that when two adjacent ball joints have a straight position, the two ball joints will be in contact with each other at the bottom (17), whereby bending of the joint to the diametrically opposite direction, is prevented.

7. A joint according to claim 2, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another and that a front, lower, diametrically opposite portion, is designed such that when two adjacent ball joints have a straight position, the two ball joints will be in contact with each other at the bottom (17), whereby bending of the joint to the diametrically opposite direction, is prevented.

8. A joint according to claim 3, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another and that a front, lower, diametrically opposite portion, is designed such that when two adjacent ball joints have a straight position, the two ball joints will be in contact with each other at the bottom (17), whereby bending of the joint to the diametrically opposite direction, is prevented.

9. A joint according to claim 4, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another and that a front, lower diametrically opposite portion, is designed such that when two adjacent ball joints have a straight position, the two ball joints will be in contact with each other at the bottom (17), whereby bending of the joint to the diametrically opposite direction is prevented.

10. A joint according to claim 5, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another and that a front, lower, diametrically opposite portion, is designed such that when two adjacent ball joints have a straight position, the two ball joints will be in contact with each other at the bottom (17), whereby bending of the joint to the diametrically opposite direction is prevented.

11. The joint according to claim 4, wherein the sleeve (14) is movably positioned about the ball joints (3–6) to be located in various positions where none, some or all of the adjacent ball joints (3–6) are locked in straight position with respect to one another.

12. The joint according to claim 5, wherein the locking means is constituted by a sleeve (16) movably positioned within the ball joints (3–6) to be located in various positions where none, some or all of the adjacent ball joints (3–6) are locked in straight position with respect to one another.

13. A joint according to claim 12, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another, and that a front, lower, diametrically opposite portion, is designed such that when two adjacent ball joints have a straight position, the two ball joints will be in contact with each other at the bottom (17), whereby bending of the joint to the diametrically opposite direction is prevented.

14. A joint according to claim 11, characterized in that each ball joint (3–6) comprises a first, essentially circular-cylindrical part (7), which passes over to a second part (8), which has modified ball-shape, the front upper portion of the first part (7) being bevelled such that, when two adjacent ball joints lie in straight position, there is a space (13) at the top between the two adjacent ball joints, which permits bending of the adjacent ball joints in one direction with respect to one another, and that a front, lower, diametrically opposite portion, is designed such that when two adjacent ball joints have a straight position, the two ball joints will be in contact with each other at the bottom (17), whereby bending of the joint to the diametrically opposite direction is prevented.

15. The joint according to claim 1, wherein said connected parts form at least part of a hose.

16. The joint according to claim 15, forming part of a vacuum cleaner, wherein one of said connected parts is rigidly connected to a nozzle and the other connected part at the joint is, in turn, connected to the vacuum cleaner itself.

17. The joint according to claim 6, wherein the front upper portion of the first part (7) is bevelled to taper the space (13) in a direction from the top to the bottom of the lower diametrically opposite portion.

18. The joint according to claim 7, wherein the front upper portion of the first part (7) is bevelled to taper the space (13) in a direction from the top to the bottom of the lower diametrically opposite portion.

19. The joint according to claim 13, wherein the front upper portion of the first part (7) is bevelled to taper the space (13) in a direction from the top to the bottom of the lower diametrically opposite portion.

20. The joint according to claim 14, wherein the front upper portion of the first part (7) is bevelled to taper the space (13) in a direction from the top to the bottom of the lower diametrically opposite portion.

* * * * *